United States Patent
Thomas

(10) Patent No.: US 8,247,017 B2
(45) Date of Patent: Aug. 21, 2012

(54) PRODUCTION OF FROZEN SWEET POTATOES

(76) Inventor: Sharon Thomas, Bedford Heights, OH (US)

( * ) Notice: Subject to any disclaimer, the term of this patent is extended or adjusted under 35 U.S.C. 154(b) by 1394 days.

(21) Appl. No.: 11/161,034

(22) Filed: Jul. 20, 2005

(65) Prior Publication Data

US 2007/0020377 A1 Jan. 25, 2007

(51) Int. Cl.
*A23L 1/216* (2006.01)
(52) U.S. Cl. ........................................................ 426/637
(58) Field of Classification Search .................... 426/637
See application file for complete search history.

(56) References Cited

U.S. PATENT DOCUMENTS

| | | |
|---|---|---|
| 3,644,129 A | 2/1972 | Sloan |
| 4,579,743 A | 4/1986 | Hullah |
| 4,632,834 A | 12/1986 | Barnes |
| 4,988,522 A | 1/1991 | Warren |

OTHER PUBLICATIONS

Zhang, G.; Abstract of CN 1101512 A; "Multiple flavour dried sweet potato chip".*
Kotani, A; abstract of JP 62091159A; "Manufacturing sweet potato chips includes slicing, frying, freezing, defrosting and re-fryign optionally with addition of aqueous sugar solution to oil".*
Bon Appetit, "Spiced Syrup", Sep. 2004, p. 1-2.*
Bon Appetit, "Sweet Potato and Yam Galette", Nov. 1997, p. 1-2.*
Gourmet, "Sweet Spiced Nuts", Nov. 2003, p. 1-2.*
Gourmet, "Sweet Potato Chips", Apr. 1986, p. 1.*
Cunningham, M., "German Fried Potatoes" in Fannie Farmer Cookbook, 1990, p. 426.*
LSU Ag Center, "Freezing Yams or Sweet Potatoes", 1998, p. 1-2.*
Rombauer et al., "About Sweet Potatoes or Yams" in Joy of Cooking, Bobbs-Merrill Company, New York, 1975, p. 324.*
Iowa State University "Preserve it right—Freezing fruits and vegetables", University Extension, Sep. 2001, p. 1-6.*
Cooking Light "Oven-fried Sweet Potatoes", Nov. 1995, p. 1.*

* cited by examiner

*Primary Examiner* — Elizabeth Gwartney
(74) *Attorney, Agent, or Firm* — Rankin, Hill & Clark LLP

(57) ABSTRACT

A process for making frozen sweet potatoes includes the steps of slicing sweet potatoes, and then applying citric acid juice, preferably, lemon juice, to the slices. A coating then is applied to the slices, the coating including a mixture of corn syrup, honey, brown sugar, lemon flavor and vanilla flavor. The slices are pan-fried, cooled to room temperature, and then frozen. If desired, a flavor-enhancing mixture can be applied to the slices while they are being cooled. The flavor-enhancing mixture preferably includes cinnamon, cane sugar, allspice, and nutmeg. The invention does not require that the sweet potatoes be water-blanched in order to maintain the flavor and color of the sweet potatoes, and it provides coated sweet potato slices that are both flavorful and attractive. The sweet potato slices can be stored for long periods of time by freezing, and they can be cooked easily and quickly by conventional techniques immediately upon removal from the freezer.

20 Claims, No Drawings

PRODUCTION OF FROZEN SWEET POTATOES

BACKGROUND OF THE INVENTION

1. Field of the Invention

The invention relates to the production of frozen sweet potatoes and, more particularly, to techniques for producing frozen sweet potatoes having enhanced flavor through the use of natural food seasonings.

2. Description of the Prior Art

A variety of methods exist for producing frozen potatoes. For example, U.S. Pat. No. 3,644,129 to Sloan discloses a method in which potato slices are blanched and then frozen. In addition to the '129 patent, many methods for producing frozen potatoes include the step of blanching since it is believed that blanching is necessary to inactivate enzymes, and thus inhibit subsequent discoloration.

As indicated in U.S. Pat. No. 4,632,834 to Barnes, blanching, when used with sweet potatoes, not only can lessen the flavor of the potatoes, but it can diminish their color. In the case of sweet potatoes, it is particularly desirable to maintain as much flavor and color as possible. To minimize the adverse effects of blanching, Barnes teaches that sliced sweet potatoes can be blanched at a relatively high temperature, and that flavor loss and color loss can be offset by the subsequent application of orange juice. While the Barnes method presumably represents an improvement over other sweet potato processing techniques that rely on blanching, it is believed that a considerable amount of flavor is still lost, as is evidenced by the need to apply orange juice "to compensate for the loss of flavor during the blanching step." Desirable, a method for producing frozen sweet potatoes would be available that does not require the use of a blanching operation.

Apart from the use of blanching as a flavor and color preservative technique, there is a shortage of methods for producing frozen potatoes having flavorful coatings, yet the use of a flavorful coating for sweet potatoes is highly desirable. U.S. Pat. No. 4,579,743 to Hullah discloses a method for preparing par-fried sliced potatoes in which the potatoes are sliced and then surface-treated such that the surface sugar molecules and starch molecules are cross-linked. The cross-linked potatoes then are water-blanched and soaked in a solution containing an oxidizer, a non-reducing sugar, and an antioxidant preservative. Subsequent to the cross-linking and soaking steps, the potatoes are par-fried and then are cryogenically cooled for packaging and freezing.

Unfortunately, Hullah's technique requires the use of a blanching step. Further, while Hullah's technique presumably results in extended product storage time through the use of cross linking and soaking steps, it is doubted that these steps could be used to enhance the flavor of the potatoes. Moreover, it cannot be said that Hullah's soaking step involves the application of a flavorful coating as that term is used conventionally.

Despite the existence of the potato-processing techniques described above, there remains a need for a technique for producing frozen sweet potatoes that are both flavorful and easy to store for an extended period of time. Ideally, the sweet potatoes would not be subjected to any processing that would diminish either their flavor or their color. Moreover, the sweet potatoes preferably would be fully prepared before freezing so that they could be prepared for the table with a minimum amount of effort. In addition, the sweet potatoes desirable would be provided with a coating that not only would enhance the flavor of the potatoes, but also would make the potatoes more attractive.

SUMMARY OF THE INVENTION

In response to the foregoing concerns, the present invention provides a new and improved method for producing frozen sweet potatoes. In the method according to the invention, sweet potatoes are peeled and then rinsed with water in order to preserve their moisture. The potatoes are sliced into a desired shape, preferably a french fry form. The slices are sprayed with citric acid juice, preferably lemon juice, in order to maintain their color and natural sweetness. After spraying, the slices are maintained at room temperature.

A coating is provided for the slices. The coating preferably includes corn syrup, honey, brown sugar, lemon flavor, and vanilla flavor. The ingredients are blended together until liquid enough to spread over the slices, preferably by brushing.

The coated potatoes are pan-fried, preferably in olive oil, vegetable oil or corn oil, at a temperature of about 325 F for about two to three minutes. The slices are turned and fried for an additional two to three minutes. After frying, the slices are removed promptly from the pan and drained on a flat, non-stick platter.

After being placed on the platter, the slices can be sprinkled with a flavor-enhancing mixture, if desired. The flavor-enhancing mixture preferably includes cinnamon, cane sugar, allspice, and nutmeg. After being sprinkled with the flavoring mixture, the slices are cooled for about one to two hours, or until room temperature is attained.

After the slices have reached room temperature, they can be placed in freezer bags in order to ensure an airtight environment. After being sealed in the freezer bags, the slices can be stored in a freezer for up to six months.

As will be appreciated by those skilled in the art, the sweet potato slices can be frozen by other methods, such as a quick-freezing process. In particular, conventional quick-freezing equipment can be employed, such as a frigoscandia freezing apparatus, in which the sweet potato slices are floated on a blast of chilled air. When using quick-freezing apparatus, the sweet potato slices are delivered to a conventional packager where they can be sealed in suitable containers. Regardless of how the slices have been frozen, they can be cooked in a frozen condition by the end user by known non-moisture heating methods, such as deep-frying, oven-baking, pan-frying or microwaving.

A feature of the present invention involves spraying the slices with a citric acid juice to maintain the color and natural flavor of the slices. It has been found that by using a citric acid juice as a preservative, the need to blanch the potatoes is eliminated. Any juices containing citric acid, such as orange juice or lemon juice, can be used. Since the uncooked sweet potato slices have only a limited ability to absorb the juice, the sweet potato slices can be soaked in a container of juice while a coating is being prepared.

A further feature of the invention is the application of a coating after the slices have been sprayed with citric acid juice. The coating is used to make the sweet potato slices more flavorful. Since the coating is applied after the slices have been preserved with citric acid juice, the full flavor of the coating is undiluted. Furthermore, since the coating is fried onto the sweet potato slices before freezing, the sweet potatoes retain their flavor when thawed, heated and served. Another feature of the invention is the use of a flavor-enhancing mixture that can be applied to the coated and cooked slices, if desired.

As a result of the present invention, frozen sweet potatoes are provided that are flavorful, not only because the use of blanching is avoided, but also because they are prepared with a coating that enhances the flavor of the potatoes. Since the sweet potato slices are prepared with the coating prior to freezing, the sweet potato slices can be heated and served with a minimum effort.

The foregoing and other features and advantages of the invention are described in more detail in the specification and claims that follow.

DESCRIPTION OF THE PREFERRED EMBODIMENT

The present invention provides a method for producing frozen sweet potatoes. As used herein, the term "sweet potatoes" includes sweet potatoes as that term commonly is used, as well as yams. Further, as used herein, the term "slices" refers to cut-up portions of sweet potatoes, preferably disk-like sections, but also french fry forms (that is, elongate, slender portions of sweet potatoes having a square or rectangular cross-section), cubes, or any other shape.

In practicing the present invention, the sweet potatoes are washed and then peeled. After peeling, the sweet potatoes are rinsed with water in order to preserve their moisture. Thereafter, the sweet potatoes are cut into slices. The slices can have serrated or corrugated edges, or they can be straight-sided. The slices can be obtained by cutting the sweet potatoes either parallel or transverse to their longitudinal axes. The thickness of the slices can be selected according to taste, although slices having a thickness of about 0.40 inch are preferred.

The slices are sprayed with a citric acid-containing juice, preferably lemon juice, in order to maintain the color and natural sweetness of the slices. If desired, other juices such as orange juice could be used. After the slices have been sprayed, they are maintained at room temperature in anticipation of further processing.

A coating is provided for the slices. The coating includes corn syrup, honey, brown sugar, lemon flavor, and vanilla flavor. A preferred composition is approximately equal parts of the foregoing ingredients. The proportions of the coating ingredients can be varied depending on factors such as the quality of the sweet potatoes being processed and the taste that is desired. For example, if a sweeter coating is desired, the proportions of corn syrup, honey, and/or brown sugar can be increased. Other changes in proportion are possible based on variations in the starting ingredients. For example, honey can be obtained in a natural flavor, with some sugars added, or with lemon flavoring added. The user may wish to use more or less honey depending on the characteristics of the honey that is used and the impact that such honey has on the taste of the final product. All such changes are believed to be within the knowledge of those skilled in the art.

After the foregoing ingredients have been placed in a common container, they are mixed together until they become a viscous liquid. The mixture then is applied to the surfaces of the slices, preferably by brushing.

After the slices have been coated, they are fried immediately, preferably by pan-frying. Pan-frying is accomplished by heating a frying pan containing olive oil, vegetable oil or corn oil (to lightly grease the bottom of the pan) at about 325 F for about one to two minutes. After the pan has been preheated, the coated slices are placed in the frying pan for about two to three minutes. The slices then are turned and fried for an additional two to three minutes. After frying, the slices are removed promptly from the pan and placed on a flat, non-stick platter. Alternatively, any excess fat or liquid may be removed from the slices by placing them on a porous platter or other drainable surface.

If desired, the coated and cooked slices can be sprinkled with a flavor-enhancing mixture. Preferred flavor-enhancing ingredients include cinnamon, cane sugar, allspice and nutmeg. A preferred composition is approximately equal parts of the foregoing ingredients, although the proportions of the ingredients can be varied in order to produce different tastes. For example, if it is desired to have more of a cinnamon taste, then the proportion of cinnamon can be increased. Other variations in the proportions of the ingredients in the flavor-enhancing mixture will be apparent to those skilled in the art.

After the slices have been sprinkled on all surfaces with the flavor-enhancing mixture, the slices are separated so that they do not touch each other. The slices then are permitted to cool to room temperature, or for about one to two hours. If desired, techniques for accelerating the cooling of the cooked slices may be used, particularly if production quantities of the slices are being manufactured.

After the slices have cooled appropriately, they can be placed in freezer bags, sealed airtight, and frozen at about 0 F. If desired, the slices can be frozen by other methods, such as quick-freezing processes. In particular, conventional quick-freezing equipment can be employed, such as a frigoscandia freezing apparatus in which the sweet potato slices are floated on a blast of chilled air. When using quick-freezing apparatus, the sweet potato slices are delivered to a conventional packager where they can be sealed in suitable containers. Regardless of the technique by which the slices are frozen, they will have a freezer storage life of about six months.

When it is desired to serve the frozen sweet potatoes, it is only necessary to heat the sweet potatoes to about 350 F in dry or non-moisture-containing environment. Suitable heating methods include deep-frying, oven-baking, pan-frying, or microwaving. If baking is selected, a typical heating schedule would be about 10 minutes on one side at 350 F, followed by an additional 10 minutes after the slices have been turned. Suitable heating methods and heating times can be selected by the user to produce a desired degree of doneness.

An important feature of the present invention is that there is no need to blanch the sweet potatoes in order to maintain their flavor and color. The use of citric acid juice, by itself, has been found adequate for that purpose.

An additional feature of the invention is the application of a flavor-enhancing coating after the slices have been sprayed with citric acid juice. Since the coating is applied after the slices have been preserved with citric acid juice, the full flavor of the coating is undiluted (as would not be the case if the citric acid juice were sprayed onto the slices after the coating had been applied). Furthermore, since the coating is fried onto the sweet potato slices before the slices are frozen, the sweet potatoes tend to retain their flavor when thawed, heated, and served. Yet another feature of the invention is the use of an additional flavor-enhancing mixture that can be sprinkled on the cooked and coated slices, if desired.

Although the invention has been described in its preferred form with a certain degree of particularity, it will be understood that the present disclosure of the preferred embodiment has been made only by way of example, and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A process for producing frozen sweet potatoes, the process comprising the steps of:
   slicing unblanched sweet potatoes into a plurality of unblanched sweet potato slices;

applying a juice containing citric acid to the plurality of unblanched sweet potato slices and maintaining the juice-applied plurality of unblanched sweet potato slices at room temperature;

coating the room temperature juice-applied plurality of unblanched sweet potato slices with a mixture that includes corn syrup, honey, brown sugar, lemon flavor and vanilla flavor;

pan frying the mixture-coated plurality of unblanched sweet potato slices on a greased pan;

cooling the pan-fried plurality of sweet potato slices to about room temperature; and freezing the cooled, pan-fried plurality of sweet potato slices.

2. The process of claim 1, wherein the unblanched sweet potatoes are sliced into french fry form in the slicing step.

3. The process of claim 1, wherein the unblanched sweet potatoes have a longitudinal axis and the slicing step occurs in a direction parallel to the longitudinal axis.

4. The process of claim 1, wherein the unblanched sweet potatoes have a longitudinal axis and the slicing step occurs in a direction transverse to the longitudinal axis.

5. The process of claim 1, wherein the juice containing citric acid is selected from the group consisting of lemon juice and orange juice.

6. The process of claim 1, wherein the mixture used in the coating step includes approximately equal parts of corn syrup, honey, brown sugar, lemon flavor, and vanilla flavor.

7. The process of claim 1, further comprising the step of sprinkling the pan-fried plurality of sweet potato slices with a flavor-enhancing mixture prior to the cooling step.

8. The process of claim 7, wherein the flavor-enhancing mixture includes cinnamon, cane sugar, allspice and nutmeg.

9. The process of claim 8, wherein the flavor-enhancing mixture includes approximately equal parts of cinnamon, cane sugar, allspice, and nutmeg.

10. The process of claim 1, wherein each of the plurality of sweet potato slices has a first side and a second opposed side, and wherein the pan frying step includes:

pan frying the first side of each of the plurality of sweet potato slices on the greased pan for about two to three minutes; and pan frying the second side of each of the plurality of sweet potato slices on the greased pan for about two to three minutes.

11. The process of claim 1, wherein the pan is greased with an oil selected from the group consisting of olive oil, vegetable oil, and corn oil.

12. Frozen sweet potatoes produced according to the process of claim 1.

13. The frozen sweet potatoes of claim 12, wherein the juice containing citric acid is lemon juice.

14. The frozen sweet potatoes of claim 12, wherein the mixture used in the coating step includes approximately equal parts of corn syrup, honey, brown sugar, lemon flavor, and vanilla flavor.

15. The frozen sweet potatoes of claim 12, wherein a flavor-enhancing mixture has been sprinkled on the pan-fried plurality of sweet potato slices prior to the cooling step.

16. The frozen sweet potatoes of claim 15, wherein the flavor-enhancing mixture includes cinnamon, cane sugar, allspice, and nutmeg.

17. The frozen sweet potatoes of claim 16, wherein the flavor-enhancing mixture includes approximately equal parts of cinnamon, cane sugar, allspice, and nutmeg.

18. The frozen sweet potatoes of claim 12, wherein each of the mixture-coated plurality of unblanched sweet potato slices has been pan fried on a pan that has been greased with an oil selected from the group consisting of olive oil, vegetable oil, and corn oil.

19. A process for producing frozen sweet potatoes, the process comprising the steps of:

slicing unblanched sweet potatoes into a plurality of unblanched sweet potato slices;

spraying lemon juice on the plurality of unblanched sweet potato slices and maintaining the lemon juice-applied plurality of unblanched sweet potato slices at room temperature;

coating the room temperature lemon juice-applied plurality of unblanched sweet potato slices with a mixture that includes corn syrup, honey, brown sugar, lemon flavor and vanilla flavor;

pan frying the mixture-coated plurality of unblanched sweet potato slices on a greased pan, wherein the pan is greased with an oil selected from the group consisting of olive oil, vegetable oil, and corn oil;

applying a flavor-enhancing mixture that includes cinnamon, cane sugar, allspice and nutmeg to the mixture-coated plurality of pan-fried sweet potato slices;

cooling the pan-fried plurality of sweet potato slices to about room temperature; and freezing the cooled, pan-fried plurality of sweet potato slices.

20. The process of claim 19, wherein:

the mixture used in the coating step includes approximately equal parts of corn syrup, honey, brown sugar, lemon flavor, and vanilla flavor; and the flavor-enhancing mixture includes approximately equal parts of cinnamon, cane sugar, allspice, and nutmeg.

* * * * *